(12) United States Patent
Asari

(10) Patent No.: US 8,169,309 B2
(45) Date of Patent: May 1, 2012

(54) IMAGE PROCESSING APPARATUS, DRIVING SUPPORT SYSTEM, AND IMAGE PROCESSING METHOD

(75) Inventor: Keisuke Asari, Katano (JP)

(73) Assignee: Sanyo Electric Co., Ltd. (JP)

( * ) Notice: Subject to any disclaimer, the term of this patent is extended or adjusted under 35 U.S.C. 154(b) by 433 days.

(21) Appl. No.: 12/478,193

(22) Filed: Jun. 4, 2009

(65) Prior Publication Data

US 2009/0303024 A1 Dec. 10, 2009

(30) Foreign Application Priority Data

Jun. 4, 2008 (JP) ................ 2008-146837

(51) Int. Cl.
*B60Q 1/00* (2006.01)

(52) U.S. Cl. ............. 340/435; 340/436; 340/932.2; 382/103

(58) Field of Classification Search ........... 340/435, 340/436, 903, 932.2; 348/118, 148; 382/103, 382/154; 701/1, 300
See application file for complete search history.

(56) References Cited

U.S. PATENT DOCUMENTS

| | | | | |
|---|---|---|---|---|
| 6,621,421 B2 * | 9/2003 | Kuriya et al. | | 340/932.2 |
| 6,985,171 B1 * | 1/2006 | Kuriya et al. | | 340/435 |
| 7,058,207 B2 * | 6/2006 | Iida et al. | | 382/104 |
| 7,379,564 B2 * | 5/2008 | Kakinami et al. | | 382/104 |
| 7,551,067 B2 * | 6/2009 | Otsuka et al. | | 340/436 |
| 7,640,107 B2 * | 12/2009 | Shimizu et al. | | 701/216 |
| 7,825,785 B2 * | 11/2010 | Li | | 340/435 |
| 7,825,828 B2 * | 11/2010 | Watanabe et al. | | 340/932.2 |
| 2005/0074143 A1 * | 4/2005 | Kawai | | 382/104 |
| 2009/0309970 A1 * | 12/2009 | Ishii et al. | | 348/143 |
| 2011/0103651 A1 * | 5/2011 | Nowak et al. | | 382/106 |

FOREIGN PATENT DOCUMENTS

| | | |
|---|---|---|
| JP | 2002-314991 | 10/2002 |
| JP | 2004-056219 | 2/2004 |
| JP | 2005-112004 | 4/2005 |

* cited by examiner

*Primary Examiner* — John A Tweel, Jr.

(74) *Attorney, Agent, or Firm* — NDQ&M Watchstone LLP

(57) ABSTRACT

An image processing apparatus includes: a guide superimposition portion that obtains a photographed image taken by an imaging device from the imaging device incorporated in a vehicle and superimposes a guide on the photographed image; and a specific region detection portion that detects a specific region which is able to be included in the photographed image. If the specific region is detected by the specific region detection portion, the guide superimposition portion does not superimpose the guide on the specific region.

15 Claims, 16 Drawing Sheets

PHOTOGRAPHED IMAGE 110
AT TIME t1

111  113  112

PHOTOGRAPHED IMAGE 120
AT TIME t2

121  123  122

BIRD'S EYE VIEW IMAGE 210
AT TIME t1

211 213 212

BIRD'S EYE VIEW IMAGE 220
AT TIME t2

221 223 222

Fig. 11 BETWEEN-FRAMES DIFFERENCE IMAGE BETWEEN TIMES t1 AND t2
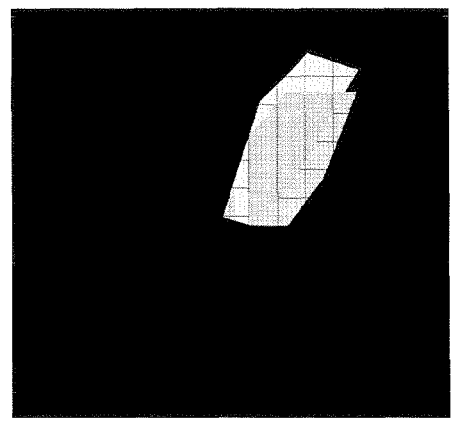
Fig. 12 BINARY IMAGE
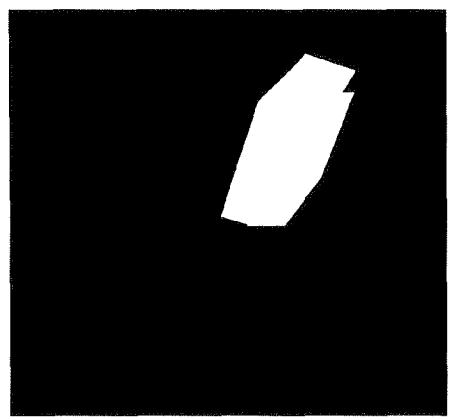
Fig. 13 EXTRACTION RESULT OF 3D OBJECT REGION
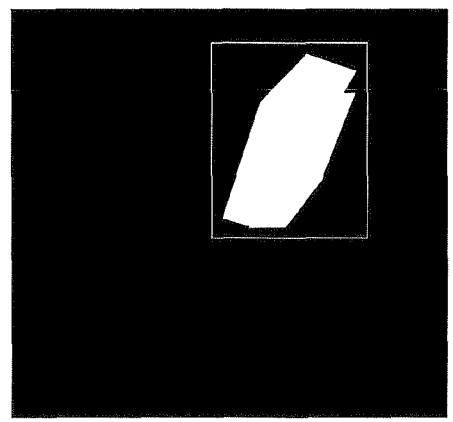

IMAGE PROCESSING APPARATUS, DRIVING SUPPORT SYSTEM, AND IMAGE PROCESSING METHOD

This nonprovisional application claims priority under 35 U.S.C. §119 (a) on Patent Application No. 2008-146837 filed in Japan on Jun. 4, 2008, the entire contents of which are hereby incorporated by reference.

BACKGROUND OF THE INVENTION

1. Field of the Invention

The present invention relates to an image processing apparatus that generates a driving support image by using a photographed image from a camera (hereinafter, also called a vehicle camera) incorporated in a vehicle, to a driving support system having the image processing apparatus and to an image processing method that generates a driving support image by using a photographed image from the vehicle camera.

2. Description of the Related Art

Together with spreading awareness of safety in recent years, vehicles that incorporate a camera are increasing. It is useful to safety support of drivers that a camera is incorporated in a vehicle and an area around the vehicle which is a blind spot for the naked eye or over a mirror is displayed.

Conventionally, as a display method for displaying an area around a vehicle by using a photographed image from a vehicle camera, a display method is known, in which an image obtained by superimposing a guide (a distance index preset on a road surface) on a photographed image from the vehicle camera is displayed. Because such a display method is easy for a driver to visually understand the distance to an obstacle (e.g., a three-dimensional, that is, 3D object higher than the road surface where the vehicle is present, or a portion lower than the road surface where the vehicle is present) by using a guide, the display method is effective for parking support of a vehicle and the like. Besides, a display method for displaying a guide depending on the height of a 3D object is also proposed. In these display methods, it is easy to understand the distance between a 3D object and the bumper height of the driver's vehicle and the like by depicting guides having a plurality of heights. In addition, as a display method for displaying a link support guide for a trailer, a display method is also proposed, in which a guide is displayed only when a template attached to a target trailer is present in a photographed image from a vehicle camera.

In the conventional display method that displays an image obtained by superimposing a guide on a photographed image from a vehicle camera, because the guide is always displayed, the guide is depicted with overlapped on a 3D object in the photographed image from the vehicle camera (see FIG. 18A and FIG. 18B). A guide line is formed of, for example: an extension line from a right end of a vehicle; an extension line from a left end of the vehicle; a line indicating a position 0.5 meter away from a back end of the vehicle; a line indicating a position 1.0 meter away from the back end of the vehicle; and a line indicating a position 2.0 meters away from the back end of the vehicle. In FIG. 18A, a line (a guide line) indicating the position 1.0 meter away from the back end of the vehicle overlaps a bicycle that is a 3D object; and an extension line from the right end of the vehicle, an extension line from the left end of the vehicle, and a line (a guide line) indicating the position 2.0 meters away from the back end of the vehicle overlap with a fence that is a 3D object. In FIG. 18B, the extension line from the right end of the vehicle, the extension line from the left end of the vehicle, the line indicating the position 1.0 meter away from the back end of the vehicle, and the line (the guide line) indicating the position 2.0 meters away from the back end of the vehicle overlap the fence that is a 3D object. In FIG. 18A, line segments indicated by slanted lines represent white lines depicted on a road surface.

As described above, the guide that is originally a distance index on a road surface is depicted on a proportion that is not the road surface, which is a confusing display for the driver.

SUMMARY OF THE INVENTION

It is an object of the present invention to provide: an image processing apparatus that generates a driving support image which a driver understands easily and visually; a driving support system having the image processing apparatus; and an image processing method that generates a driving support image which the driver understands easily and visually.

To achieve the above object, an image processing apparatus according to the present invention comprises: a guide superimposition portion that obtains a photographed image taken by an imaging device from the imaging device incorporated in a vehicle and superimposes a guide on the photographed image; and a specific region detection portion that detects a specific region which may be included in the photographed image. If the specific region is detected by the specific region detection portion, the guide superimposition portion does not superimpose the guide on the specific region.

To achieve the above object, a driving support system according to the present invention comprises: an imaging device that is incorporated in a vehicle; a display device; and an image processing apparatus having the above structure that applies image processing to an image from the imaging device and outputs the processed image to the display device.

To achieve the above object, an image processing method according to the present invention comprises: a step of obtaining a photographed image taken by an imaging device from the imaging device incorporated in a vehicle; a step of detecting a specific region which is able to be included in the photographed image; and a step of superimposing a guide on the photographed image. If the specific region is detected in the detecting step, the guide is not superimposed on the specific region in the superimposing step.

DESCRIPTION OF THE DRAWINGS

FIG. 11 is a view showing a between-frames difference image between the times t1 and t2.

FIG. 12 a view showing a binary image that is obtained by applying binary coding manipulation to the difference image in FIG. 11.

FIG. 13 is a view showing an image from which a three-dimensional region is extracted.

DESCRIPTION OF THE PREFERRED EMBODIMENTS

The embodiments of the present invention are explained below with reference to the drawings.

First Embodiment

Figure 1:
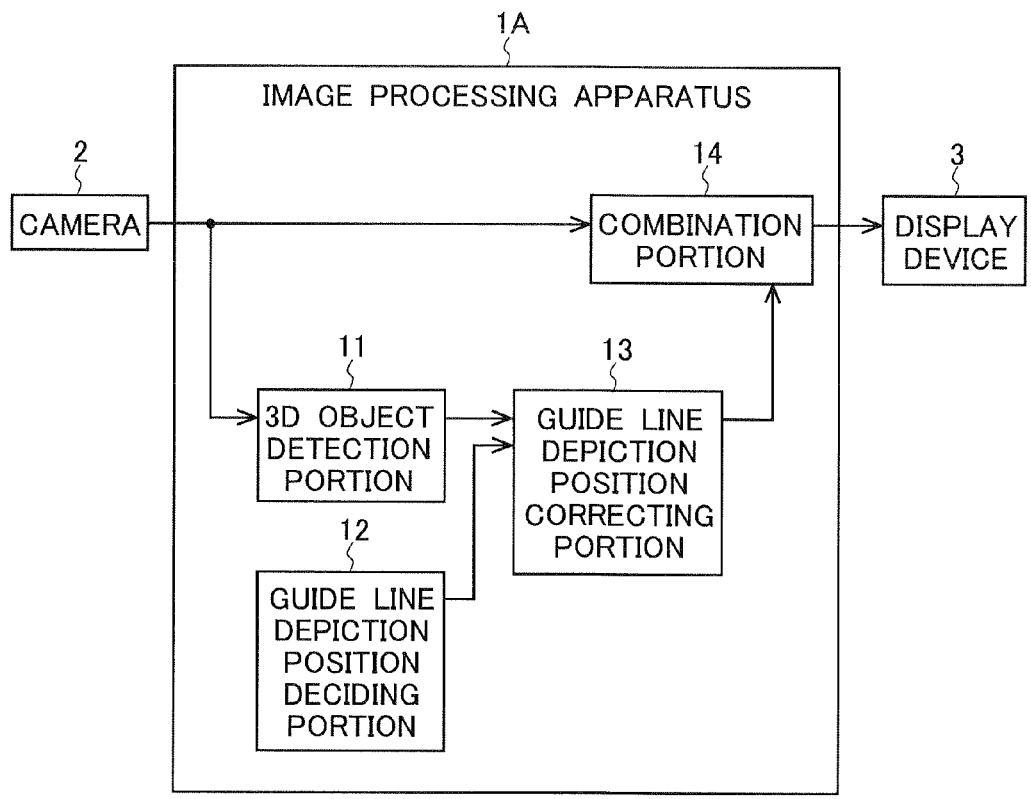
FIG. 1 is a block diagram showing a structure of a driving support system according to a first embodiment of the present invention.

FIG. 1 is a block diagram showing a structure of a driving support system according to a first embodiment of the present invention. The driving support system in FIG. 1 includes an image processing apparatus 1A that generates a driving support image by using a photographed image from a camera 2 and outputs the driving support image to a display device 3; the camera 2; and the display device 3. As the camera 2, for example, a camera using CCDs (Charge Coupled Devices), or a camera using a CMOS (Complementary Metal Oxide Semiconductor) image sensor is employed. Besides, as the display device 3, for example, a liquid crystal monitor is used.

The image processing apparatus 1A includes: a 3D object detection portion 11 that detects a 3D object from a photographed image from the camera 2; a guide line depiction position deciding portion 12 that obtains a depiction position of a guide line from parameters such as a on-vehicle mount position for mounting the camera 2 on the vehicle and the like; a guide line depiction position correcting portion 13 that corrects the depiction position of the guide line based on a detection result from the 3D object detection portion 11; and a combination portion 14 that generates a driving support image which is a combined image of a photographed image from the camera 2 and a guideline and outputs the driving support image to the display device 3.

Figure 2:
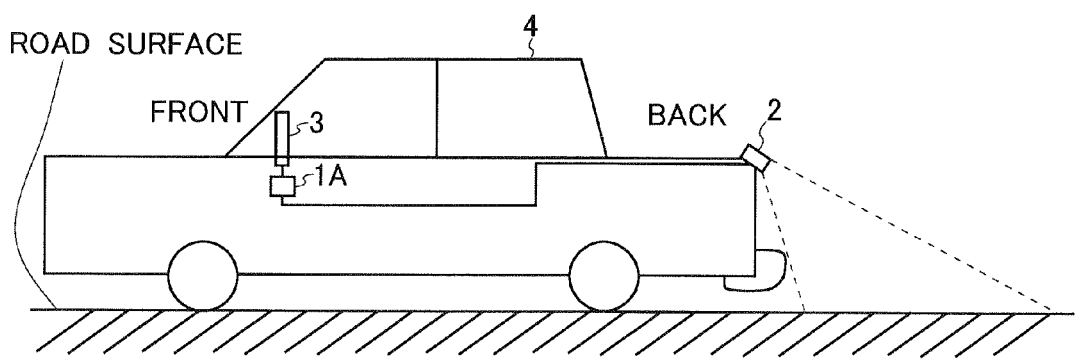
FIG. 2 is a view showing a state in which the driving support system shown in FIG. 1 is incorporated in a vehicle.

FIG. 2 is a view showing a state in which the driving support system in FIG. 1 is incorporated in a vehicle. The image processing apparatus 1A and the display device 3 are disposed in the vehicle room of the vehicle 4, and are installed near the driver's seat, for example, of the vehicle 4. Besides, the camera 2 is mounted on a back portion of the vehicle 4 and takes an image in an oblique downward direction from the mount position.

Processing that the image processing apparatus 1A executes is explained with reference to a flow chart shown in FIG. 3. First, a photographed image is obtained from the camera 2 (the step S1). For example, a photographed image taken at a time t1 (hereinafter, also simply called the photographed image at the time t1) and a photographed image taken at a time t2 (hereinafter, also simply called the photographed image at the time t2) are obtained. It is assumed that the time t2 comes after the time t1 and the vehicle 4 moves between the times t1 and t2. Accordingly, the way of a road surface being seen is different between the times t1 and t2.

Figure 4A:
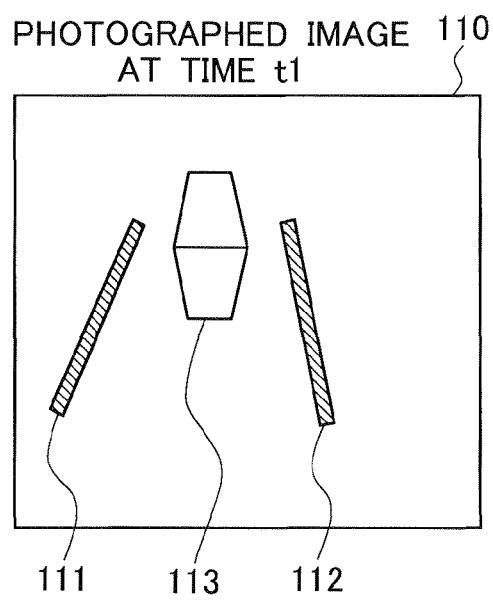
FIG. 4A is a view showing a photographed image at a time t1.
Figure 4B:
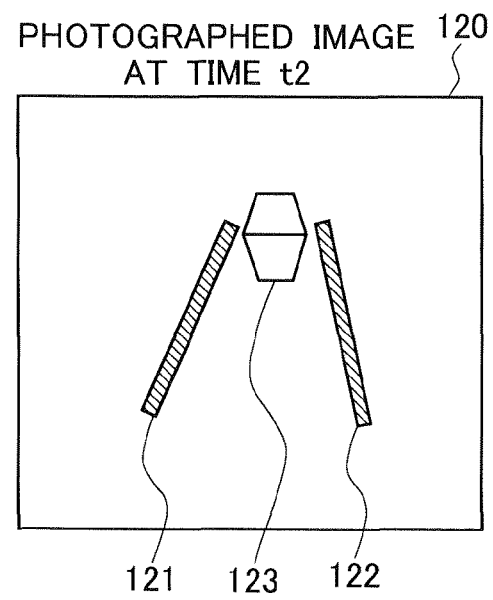
FIG. 4B is a view showing a photographed image at a time t2.

Now, it is assumed that an image 110 shown in FIG. 4A is obtained as the photographed image at the time t1 and an image 120 shown in FIG. 4B is obtained as the photographed image at the time t2. At the times t1 and t2, it is assumed that first and second white lines drawn parallel to each other on the road surface and a rectangular-parallelepiped 3D object α situated between the first and second white lines are included in the visual field of the camera 2. In FIG. 4A, line segments 111 and 112 that are indicated by slanted lines are the first and second white lines in the image 110, and in FIG. 4B, line segments 121 and 122 are the first and second white lines in the image 120. In FIG. 4A, a 3D object 113 in the image is a 3D object α, and in FIG. 4B, a 3D object 123 is a 3D object α in the image 120.

In the next step S2, the 3D object detection portion 11 detects the 3D object by using the photographed image obtained from the camera 2. Here, an example way of detecting a 3D object from an image from a single-lens camera is explained below with reference to a flow chart shown in FIG. 5.

In the step S201, characteristic points are extracted from the photographed image at the time t1. A characteristic point is a point that is distinguishable from surrounding points and is easy to track. It is possible to automatically detect such a characteristic point by using a well-known characteristic point detector (not shown) that detects a pixel the color-tone change amount of which becomes large in horizontal and vertical directions. The characteristic point detector is, for example, a Harris's corner detector, or a SUSAN's corner detector. As characteristic points to be extracted, for example, an intersection or an end point of a white line drawn on a road surface, a stain or a flaw of a road surface, an end portion or a stain of a 3D object are expected.

In the step S202 following the step S201, the photographed image at the time t1 and the photographed image at the time t2 are compared with each other, and an optical flow on the coordinates of the photographed images between the times t1 and t2 is obtained by using the publicly known block matching method and the gradient method. An optical flow is an aggregate of a plurality of moving vectors. In the optical flow obtained in the step S202, the moving vector of the characteristic point extracted in the step S201 is also included. The moving vector of a noticed characteristic point between two images represents the moving direction and the size of the noticed characteristic point between the two images. Here, a moving vector has the same meaning as a motion vector.

A plurality of characteristic points are extracted in the step S201 and the respective moving vectors of the plurality of characteristic points are obtained in the step S202. However, here, for specific explanation, two characteristic points included in the plurality of characteristic points are noticed. The two characteristic points include first and second characteristic points.

Figure 6:
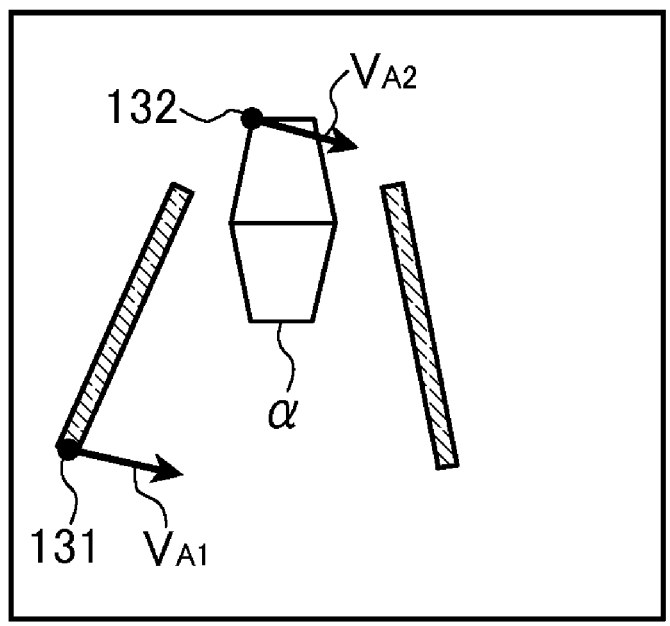
FIG. 6 is a view showing characteristic points on a photographed image and moving vectors between the times t1 and t2 of the characteristic points.

In FIG. 6, the first and second characteristic points extracted from the photographed image at the time t1 are represented with superimposed on the photographed image at the time t1. In FIG. 6, points 131 and 132 represent the first and second characteristic points extracted from the photographed image at the time t1. The first characteristic point is an end point of the first white line and the second characteristic point is an end point of the 3D object α that is situated on an upper surface of the 3D object α. In the photographed image a the time t1 shown in FIG. 6, the moving vector $V_{A1}$ of the first characteristic point and the moving vector $V_{A2}$ of the second characteristic point are also represented. The start point of the moving vector $V_{A1}$ matches the point 131 and the start point of the moving vector $V_{A2}$ matches the point 132.

In the step S203 following the step S202, the photographed images at the times t1 and t2 are respectively transformed into bird's eye view images.

Hereinafter, a way of generating a bird's eye view image by using a perspective projection transformation is explained with reference to FIG. 7.

Figure 7:
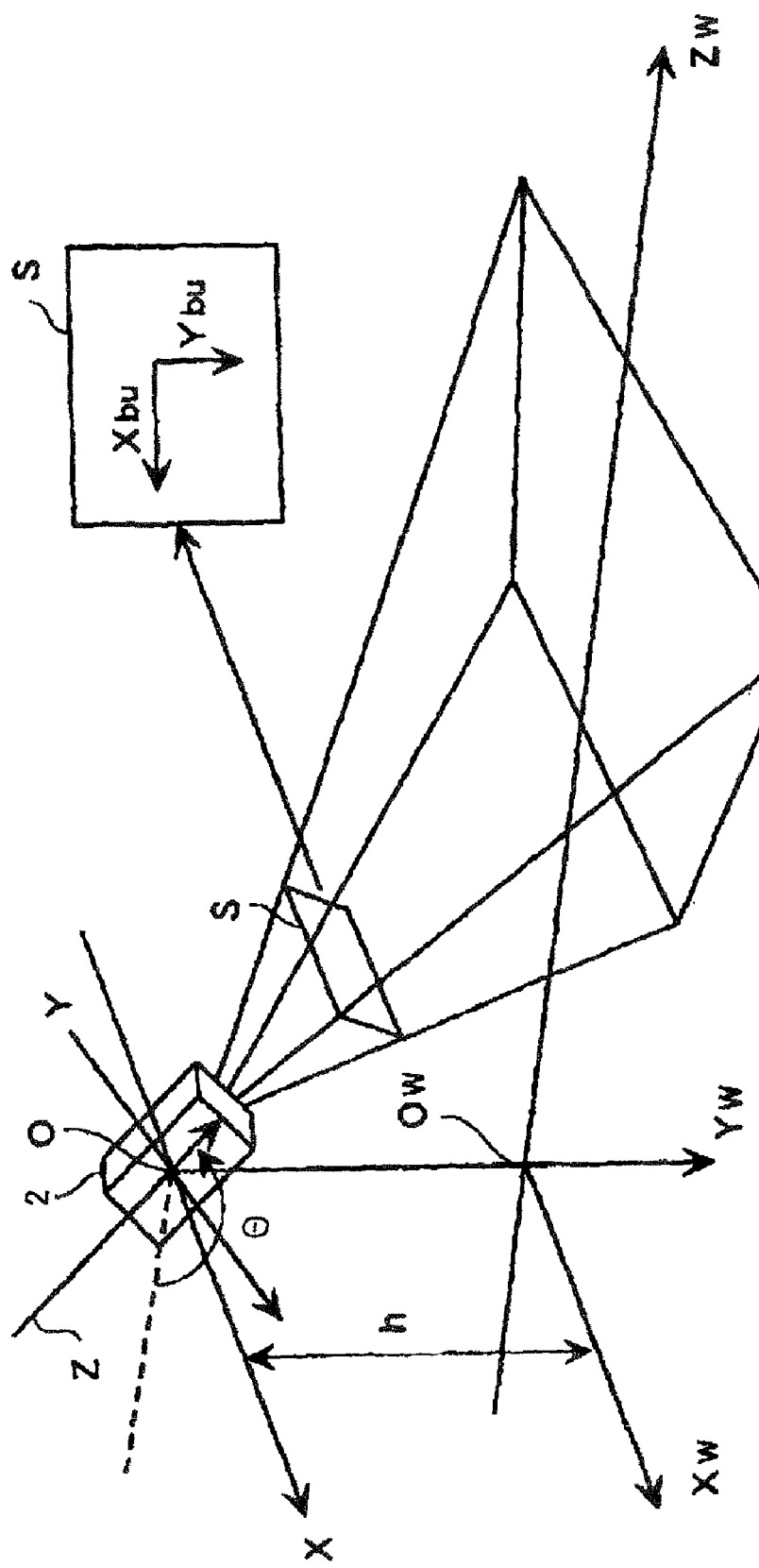
FIG. 7 is a view showing a relationship among a camera coordinate system, a coordinate system of an imaging surface and a world coordinate system.

FIG. 7 shows a relationship among a camera coordinate system XYZ, a coordinate system $X_{bu}Y_{bu}$ on an imaging surface S of the camera 2, and a world coordinate system $X_{W}Y_{W}Z_{W}$ including a two-dimensional ground surface coordinate system $X_{W}Z_{W}$. The coordinate system $X_{bu}Y_{bu}$ is a coordinate system on which a photographed image is defined.

The camera coordinate system XYZ is a three-dimensional coordinate system having an X-axis, a Y-axis and a Z-axis as coordinate axes. The coordinate system $X_{bu}Y_{bu}$ on the imaging surface S is a two-dimensional coordinate system having an $X_{bu}$-axis and a $Y_{bu}$-axis as coordinate axes. The two-dimensional ground surface coordinate system $X_{W}Z_{W}$ is a two-dimensional coordinate system having an $X_{W}$-axis and a $Z_{W}$-axis as coordinate systems. The world coordinate system $X_{W}Y_{W}Z_{W}$ is a three-dimensional coordinate system having a $X_{W}$-axis, a $Y_{W}$-axis and a $Z_{W}$-axis as coordinate axes.

Hereinafter, the camera coordinate system XYZ, the coordinate system $X_{bu}Y_{bu}$ on the imaging surface S, the two-dimensional ground surface coordinate system $X_{W}Z_{W}$ and the world coordinate system $X_{W}Y_{W}Z_{W}$ are sometimes simply shortened to the camera coordinate system, the coordinate system on the imaging surface S, the two-dimensional ground surface coordinate system, and the world coordinate system, respectively.

In the camera coordinate system XYZ, with the optical center of the camera 2 used as the origin O, the Z-axis is plotted in the optical axis direction, the X-axis is plotted in a direction orthogonal to the Z-axis and also parallel to the ground surface, and the Y-axis is plotted in a direction orthogonal to the Z-axis and the X-axis. In the coordinate system $X_{bu}Y_{bu}$ on the imaging surface S, with the center of the imaging surface S used as the origin, the $X_{bu}$-axis is plotted in the lateral direction of the imaging surface S, and the $Y_{bu}$-axis is plotted in the longitudinal direction of the imaging surface S.

In the world coordinate system $X_{W}Y_{W}Z_{W}$, with an intersection between the ground surface and a vertical line that passes through the origin O of the camera coordinate system XYZ used as the origin $O_{W}$, the $Y_{W}$-axis is plotted in a direction perpendicular to the ground surface, the $X_{W}$-axis is plotted in a direction parallel to the X-axis of the camera coordinate system XYZ, and the $Z_{W}$-axis is plotted in a direction orthogonal to the $X_{W}$-axis and $Y_{W}$-axis.

The amount of parallel movement between the $X_{W}$-axis and X-axis is h, and the direction of this parallel movement is a vertical direction. The obtuse angle formed by the $Z_{W}$-axis and the Z-axis is equal to the tilt angle Θ. Values of h and Θ are preset and given to the image processing apparatus 1A.

Coordinates of a pixel in the camera coordinate system XYZ are expressed as (x, y, z). These x, y, and z are an X-axis component, a Y-axis component, and a Z-axis component, respectively, in the camera coordinate system XYZ. Coordinates of a pixel in the world coordinate system $X_{W}Y_{W}Z_{W}$ are expressed as ($x_{w}$, $y_{w}$, $z_{w}$). These $x_{w}$, $y_{w}$, and $z_{w}$ are an $X_{W}$-axis component, a $Y_{W}$-axis component, and a $Z_{W}$-axis component, respectively, in the world coordinate system $X_{W}Y_{W}Z_{W}$. Coordinates of a pixel in the two-dimensional ground surface coordinate system $X_{W}Z_{W}$ are expressed as ($x_{w}$, $z_{w}$). These $x_{w}$ and $z_{w}$ are an $X_{W}$-axis component and a $Z_{W}$-axis component, respectively, in the two-dimensional ground surface coordinate system $X_{W}Z_{W}$, and they are equal to an $X_{W}$-axis component and a $Z_{W}$-axis component in the world coordinate system $X_{W}Y_{W}Z_{W}$, respectively. Coordinates of a pixel in the coordinate system $X_{bu}Y_{bu}$ on the imaging surface S are expressed as ($x_{bu}$, $y_{bu}$). These $x_{bu}$ and $y_{bu}$ are an $X_{bu}$-axis component and $Y_{bu}$-axis component, respectively, in the coordinate system $X_{bu}Y_{bu}$ on the imaging surface S.

A transformation formula for transformation between the coordinates (x, y, z) of the camera coordinate system XYZ and the coordinates ($x_{w}$, $y_{w}$, $z_{w}$) of the world coordinate system $X_{W}Y_{W}Z_{W}$ is expressed by the following formula (1):

$$\begin{bmatrix} x \\ y \\ z \end{bmatrix} = \begin{bmatrix} 1 & 0 & 0 \\ 0 & \cos\Theta & -\sin\Theta \\ 0 & \sin\Theta & \cos\Theta \end{bmatrix} \left( \begin{bmatrix} x_w \\ y_w \\ z_w \end{bmatrix} + \begin{bmatrix} 0 \\ h \\ 0 \end{bmatrix} \right) \quad (1)$$

Here, the focal length of the camera 2 is defined as F. Then, a transformation formula for transformation between the coordinates ($x_{bu}$, $y_{bu}$) of the coordinate system $X_{bu}Y_{bu}$ on the imaging surface S and the coordinates (x, y, z) of the camera coordinate system XYZ is expressed by the following formula (2):

$$\begin{bmatrix} x_{bu} \\ y_{bu} \end{bmatrix} = \begin{bmatrix} F\dfrac{x}{z} \\ F\dfrac{y}{z} \end{bmatrix} \quad (2)$$

Obtained from the above formulas (1) and (2) is a transformation formula (3) for transformation between the coordinates ($x_{bu}$, $y_{bu}$) of the coordinate system $X_{bu}Y_{bu}$ on the imaging surface S and the coordinates ($x_{w}$, $z_{w}$) of the two-dimensional ground surface coordinate system $X_{W}Z_{W}$:

$$\begin{bmatrix} x_{bu} \\ y_{bu} \end{bmatrix} = \begin{bmatrix} \dfrac{Fx_w}{h\sin\Theta + z_w\cos\Theta} \\ \dfrac{(h\cos\Theta - z_w\sin\Theta)F}{h\sin\Theta + z_w\cos\Theta} \end{bmatrix} \quad (3)$$

Moreover, although not shown in FIG. 7, a bird's eye view coordinate system $X_{au}Y_{au}$ as a coordinate system for a bird's eye view image will be defined. The bird's eye view coordinate system $X_{au}Y_{au}$ is a two-dimensional coordinate system having an $X_{au}$-axis and a $Y_{au}$-axis as coordinate axes. Coordinates of a pixel in the bird's eye view coordinate system $X_{au}Y_{au}$ are expressed as $(x_{au}, y_{au})$. The bird's eye view image is expressed by pixel signals of a plurality of pixels arrayed two dimensionally, and the position of each pixel on the bird's eye view image is expressed by coordinates $(x_{au}, y_{au})$. These $x_{au}$ and $y_{au}$ are an $X_{au}$-axis component and $Y_{au}$-axis component, respectively, in the bird's eye view coordinate system $X_{au}Y_{au}$.

The bird's eye view image is an image obtained by transforming a photographed image from the actual camera into an image observed from a visual point of a virtual camera (hereinafter, called as a virtual visual point). More specifically, the bird's eye view image is an image obtained by transforming the photographed image into an image observed when the ground surface is vertically looked down. This type of image transformation is generally also called a visual point transformation.

A plane which matches the ground surface and on which the two-dimensional ground surface coordinate system $X_W Z_W$ is defined is parallel to a plane on which the bird's eye view coordinate system $X_{au}Y_{au}$ is defined. Accordingly, projection from the two-dimensional ground surface coordinate system $X_W Z_W$ onto the bird's eye view coordinate system $X_{au}Y_{au}$ of the virtual camera is performed by parallel projection. Assuming that the height of the virtual camera (that is, the height of the virtual visual point) is H, a transformation formula for transformation between the coordinates $(x_w, z_w)$ of the two-dimensional ground surface coordinate system $X_W Z_W$ and the coordinates $(x_{au}, y_{au})$ of the bird's eye view coordinate system $X_{au}Y_{au}$ is expressed by the following formula (4). The height H of the virtual camera is preset. Further, modifying the formula (4) provides the following formula (5):

$$\begin{bmatrix} x_{au} \\ y_{au} \end{bmatrix} = \frac{F}{H} \begin{bmatrix} x_w \\ z_w \end{bmatrix} \quad (4)$$

$$\begin{bmatrix} x_w \\ z_w \end{bmatrix} = \frac{H}{F} \begin{bmatrix} x_{au} \\ y_{au} \end{bmatrix} \quad (5)$$

Assigning the obtained formula (5) to the above formula (3) provides the following formula (6):

$$\begin{bmatrix} x_{bu} \\ y_{bu} \end{bmatrix} = \begin{bmatrix} \dfrac{FHx_{au}}{Fh\sin\Theta + Hy_{au}\cos\Theta} \\ \dfrac{F(Fh\cos\Theta - Hy_{au}\sin\Theta)}{Fh\sin\Theta + Hy_{au}\cos\Theta} \end{bmatrix} \quad (6)$$

From the above formula (6), the following formula (7) for transforming the coordinates $(X_{bu}, Y_{bu})$ of the coordinate system $X_{bu}Y_{bu}$ on the imaging surface S into the coordinates $(x_{au}, Y_{au})$ of the bird's eye view coordinate system $X_{au}Y_{au}$ is obtained:

$$\begin{bmatrix} x_{au} \\ y_{au} \end{bmatrix} = \begin{bmatrix} \dfrac{x_{bu}(Fh\sin\Theta + Hy_{au}\cos\Theta)}{FH} \\ \dfrac{Fh(F\cos\Theta - y_{bu}\sin\Theta)}{H(F\sin\Theta + y_{bu}\cos\Theta)} \end{bmatrix} \quad (7)$$

Because the coordinates $(x_{bu}, y_{bu})$ of the coordinate system $X_{bu}Y_{bu}$ on the imaging surface S represent the coordinates in a projective image, the photographed image is able to be transformed into a bird's eye view image by using the above formula (7).

Specifically, in accordance with the formula (7), a bird's eye view image is able to be generated by transforming the coordinates $(x_{bu}, y_{bu})$ of each pixel of the photographed image into the coordinates $(x_{au}, y_{au})$ of the bird's eye view coordinate system. The bird's eye view image is formed of pixels arrayed in the bird's eye view coordinate system.

In practical use, in accordance with the formula (7), table data are prepared which indicate a relationship between the coordinates $(x_{bu}, y_{bu})$ of each pixel of the photographed image and the coordinates $(x_{au}, y_{au})$ of each pixel of the bird's eye view image, and the table data are stored into a memory (not shown) in advance. Then, the perspective projection transformation that transforms the photographed image into the bird's eye view image by using the table data is implemented. Of course, the bird's eye view image may be generated by performing a perspective projection transformation calculation every time a photographed image is obtained. Besides, here, the way of generating a bird's eye view image by using the perspective projection transformation is explained. However, a bird's eye view image may be obtained from a photographed image by using a planar projective transformation instead of obtaining a bird's eye view image from a photographed image by using the perspective projection transformation.

Figure 8A:
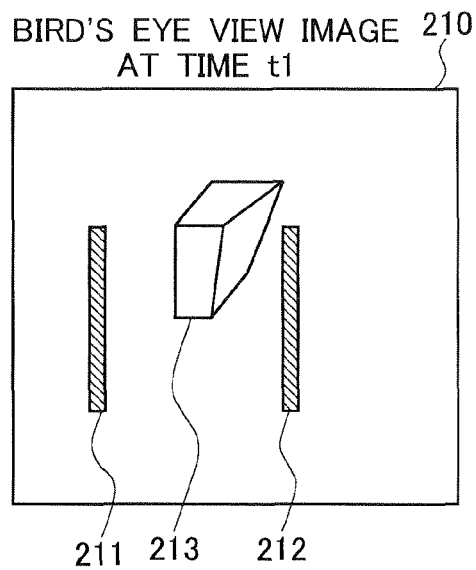
FIG. 8A is a view showing a bird's eye image at the time t1.
Figure 8B:
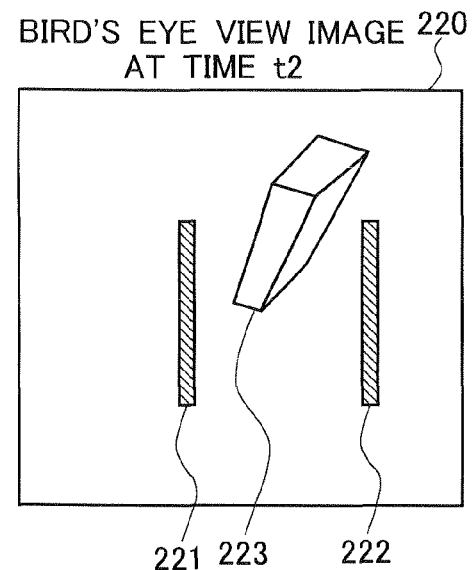
FIG. 8B is a view showing a bird's eye image at the time t2.

The bird's eye view images based on the photographed images at the times t1 and t2 are called the bird's eye view images at the times t1 and t2, respectively. Images 210 and 220 shown in FIGS. 8A and 8B respectively represent the bird's eye view images at the times t1 and t2 based on the images 110 and 120 shown in FIGS. 4A and 4B. In FIG. 8A, line segments 211 and 212 indicated by slanted lines are the first and second white lines in the image 210, and in FIG. 8B, line segments 221 and 222 indicated by slanted lines are the first and second white lines in the image 220. In FIG. 8A, a 3D object 213 on the image is the 3D object α in the image 210, and in FIG. 8B, a 3D object 223 on the image is the 3D object α in the image 220.

Figure 9:
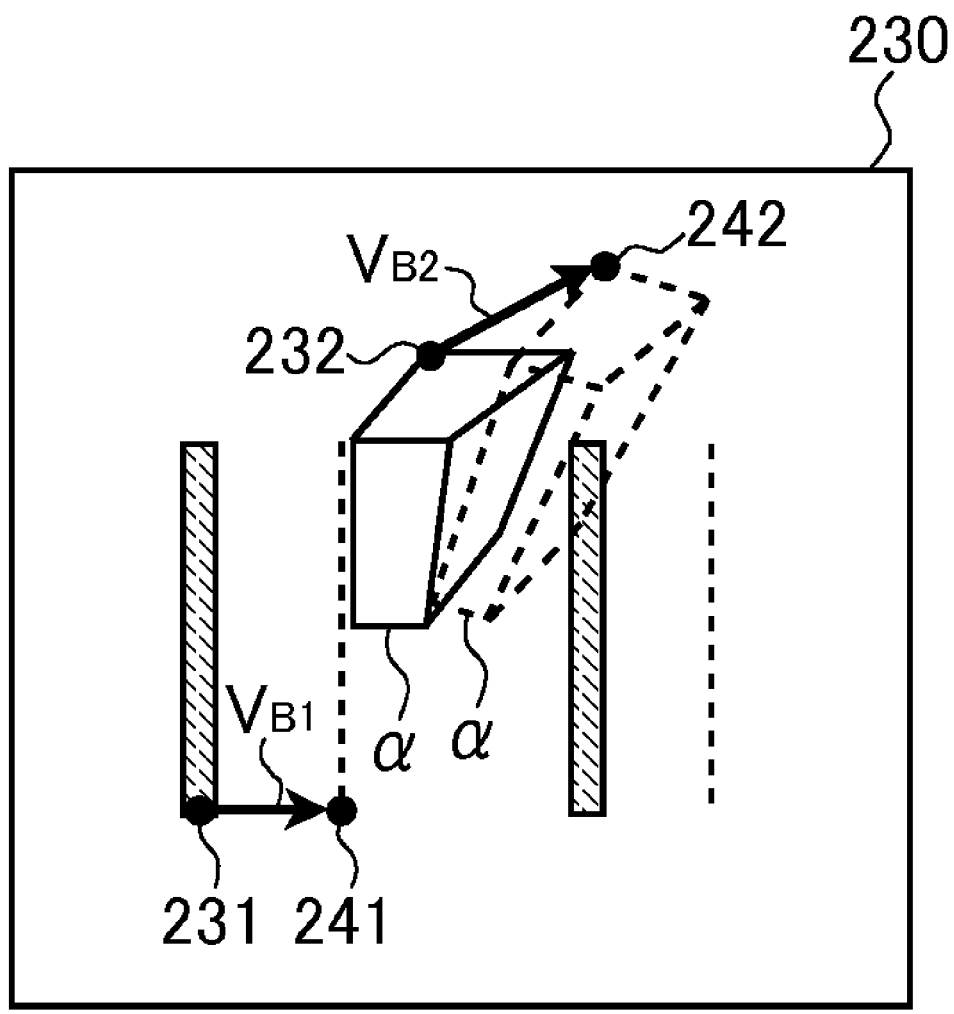
FIG. 9 is a view showing characteristic points on a bird's eye view image and moving vectors between the times t1 and t2 of the characteristic points.

In the step S204 following the step S203 (see FIG. 5), the characteristic points that are extracted from the photographed image at the time t1 in the step S201 and the moving vectors that are calculated in the step S202 are mapped on the bird's eye view image coordinate (in other words, projected). FIG. 9 is a view showing an image obtained by superimposing the mapped characteristic points and moving vectors superimposed on an image 230 that is obtained by overlaying the bird's eye view images at the times t1 and t2 with each other. However, in FIG. 9, for prevention of complication of the illustration, the first and second white lines in the bird's eye view image at the time t2 are represented by dotted lines, and the outline of the 3D object in the bird' eye view image at the time t2 is represented by a broken line.

In FIG. 9, dots 231 and 232 are the first and second characteristic points at the time t1 mapped on the bird's eye view image coordinate, respectively. In FIG. 9, vectors $V_{B1}$ and $V_{B2}$ are the moving vectors of the first and second characteristic points mapped on the bird's eye view image coordinate, respectively. The start point of the moving vector $V_{B1}$ matches the dot 231 and the start point of the moving vector $VB_2$ matches the dot 232. Dots 241 and 242 represent the end points of the moving vectors $V_{B1}$ and $V_{B2}$, respectively.

In the step S205 following the step S204, the bird's eye view image at the time t1 is corrected by using information (hereinafter, called camera movement information) about movement of the camera 2 due to movement of the vehicle 4. The vehicle movement information is obtained as follows, for example.

When ground corresponding characteristic points on the bird' eye view images at the times t1 and t2 are represented as $(x_1, y_1)$, and $(x_2, y_2)$, respectively, the moving vector of the ground corresponding characteristic points is expressed by the following formula (11):

$$(f_x, f_y)^T = (x_2, y_2)^T - (x_1, y_1)^T \quad (11)$$

Figure 10:
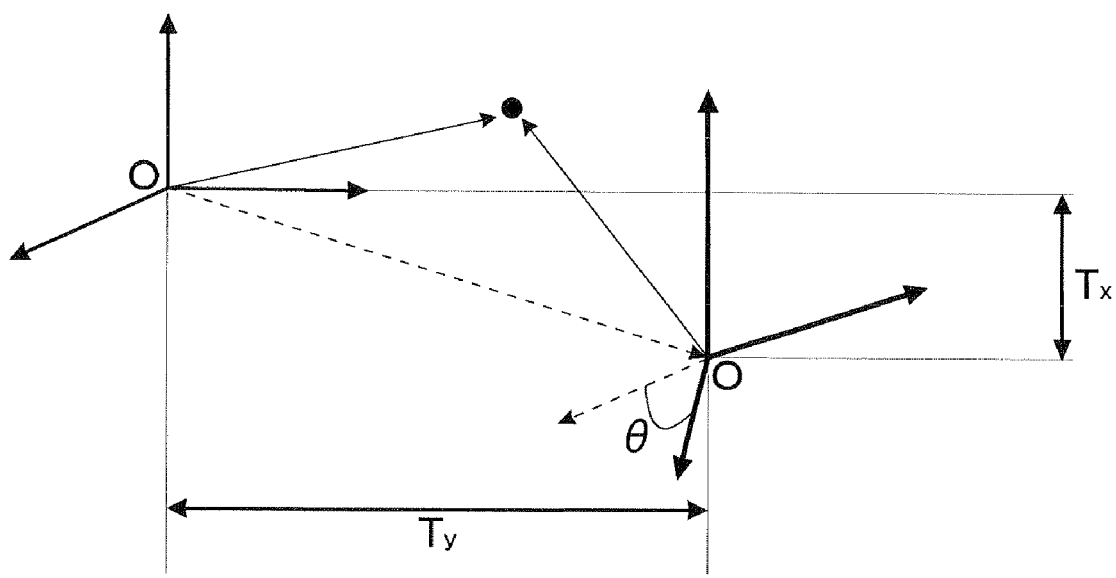
FIG. 10 is a view representing camera movement information by using a coordinate system.

When the camera movement information between the times t1 and t2 is represented with the coordinate system in FIG. 10, the following formula (12) is obtained as a relationship between ground corresponding characteristic points on the bird's eye view images at the times t1 and t2:

$$\begin{pmatrix} x_2 \\ y_2 \end{pmatrix} = \begin{pmatrix} \cos\theta & -\sin\theta \\ \sin\theta & \cos\theta \end{pmatrix} \begin{pmatrix} x_1 \\ y_1 \end{pmatrix} + \begin{pmatrix} T_x \\ T_y \end{pmatrix} \quad (12)$$

where, $\theta$ is the rotation angle of the camera 2, $T_x$ and $T_y$ are the x-direction movement amount of the camera 2, and the y-direction movement amount of the camera 2, respectively.

Here, if $\theta$ is small (if the vehicle 4 moves at a low speed, or if the frame sampling rate of the camera 2 is high), because $\cos\theta$ is able to be approximated to 1 and $\sin\theta$ is able to be approximated to $\theta$, the above formula (12) becomes the following formula (13):

$$\begin{pmatrix} x_2 \\ y_2 \end{pmatrix} = \begin{pmatrix} 1 & -\theta \\ \theta & 1 \end{pmatrix} \begin{pmatrix} x_1 \\ y_1 \end{pmatrix} + \begin{pmatrix} T_x \\ T_y \end{pmatrix} \quad (13)$$

By assigning the above formula (11) to the above formula (13) and arranging it, the following formula (14) is obtained:

$$\theta(y_1 - x_1)^T - (T_x, T_y)^T + (f_x, f_y)^T = 0 \quad (14)$$

Here, $(f_x f_y)^T$ and $(y_1 - x_1)^T$ are obtained at the time of calculating the moving vectors, and $\theta$ and $(T_x T_y)^T$ are unknown numbers. If there is information about the position $(x_1 \ y_1)^T$ and the moving vector $(f_x f_y)^T$ of the two ground corresponding characteristic points, the above unknown numbers are able to be calculated from the above formula (4).

When the coordinates of the two ground corresponding characteristic points on the bird's eye view image at the time t1 are $(x_{12} \ y_{12})^T$ and $(x_{11} \ y_{11})^T$, and the corresponding moving vectors are $(f_{x1} \ f_{x1})^T$ and $(f_{x2} \ f_{y2})^T$, the following formulas (15) and (16) are obtained from the above formula (14):

$$\theta(y_{11} - x_{11})^T - (T_x T_y)^T + (f_{x1} f_{y1})^T = 0 \quad (15)$$

$$\theta(y_{12} - x_{12})^T - (T_x T_y)^T + (f_{x2} f_{y2})^T = 0 \quad (16)$$

By calculating a difference between the above formulas (15) and (16), the following formula (17) is obtained:

$$\theta \begin{pmatrix} y_{11} - y_{12} \\ x_{12} - x_{11} \end{pmatrix} + \begin{pmatrix} f_{x1} - f_{x2} \\ f_{y1} - f_{y2} \end{pmatrix} = 0 \quad (17)$$

From the above formula (17), the following formulas (18) and (19) are obtained:

$$\theta = (f_{x2} - f_{x1})/(y_{11} - y_{12}) \quad (18)$$

$$\theta = (f_{y2} - f_{y1})/(x_{12} - x_{11}) \quad (19)$$

Here, ground corresponding characteristic points are selected according to the following procedure by using the constraint formulas (the above formulas (15), (16), (18), and (19)):

(i) Two characteristic points the distance between which is equal to a threshold value or more on an image are selected from the group of the extracted characteristic points.

(ii) If a difference between the directions of both moving vectors is equal to a threshold value or more and a difference between the sizes of both moving vectors is equal to a threshold value or more, the processing returns to (i).

(iii) Information about the positions and moving vectors of both characteristic points are assigned to the above formulas (18) and (19), and the results are represented as $\theta_1$ and $\theta_2$. If $\Delta\theta = |\theta_1 - \theta_2|$ is larger than a set threshold value, the processing returns to (i).

(iv) $\theta_1$ and $\theta_2$ calculated in (iii) are assigned respectively to the above formulas (15) and (16), and the results are represented as $(T_{x1} \ T_{y1})^T$ and $(T_{x2} \ T_{y2})^T$. If $(T_{x1} - T_{x2})^2 + (T_{y1} - T_{y2})^2$ is larger than a set threshold value, the processing returns to (i).

(v) The two selected characteristic points are determined as the ground corresponding characteristic points, and the average of the movement amounts of the ground corresponding characteristic points is the camera movement information.

By using the camera movement information thus obtained, that is, the camera rotation amount $\theta$ and the camera parallel movement amounts $T_x$, $T_y$ and by following the above formula (13), the bird's eye view image at the time t1 is transformed into a bird's eye view image (hereinafter, called a reference image) in which the road surface looks in the same way as in the bird's eye view image at the time t2.

In the step S206 following the step S205 (see FIG. 5), by calculating a difference between the reference image and the bird's eye view image at the time t2, a between-frames difference image between the times t1 and t2 shown in FIG. 11 is obtained. In the step S207 following the step S206, a threshold value is set for the difference image in advance and binary coding manipulation is applied to the difference image. FIG. 12 shows an image after the binary coding manipulation. Further, in the step S208 following the step S207, a 3D object region is extracted by applying small region removing manipulation and region connecting manipulation to the binary-coded image in FIG. 12. A portion surrounded by an outline frame in FIG. 13 is the extracted 3D object region. Here, the threshold values that are used to perform the processing represented by the flow chart in FIG. 5 described above may be stored in a memory (not shown) in the 3D object detection portion 11 in advance.

Here, returning to FIG. 3, the processing after the step S2 is explained. In the step S3, the guide line depiction position deciding portion 12 obtains a depiction position of a guide line. Because a depiction position of a guide line is able to be obtained in advance from parameters such as the on-vehicle mount position of the camera 2 and the like, it may be performed that guide line depiction position data are stored in a memory (not shown) in the guide line depiction position deciding portion 12 in advance; and in the step S3, the data stored in the memory are read out. The guide line is formed of, for example: an extension line from a right end of a vehicle 4; an extension line form a left end of the vehicle 4; a line indicating a position 0.5 meter away from a back end of the vehicle 4; a line indicating a position 1.0 meter away from the back end of the vehicle 4; and a line indicating a position 2.0 meters away from the back end of the vehicle 4. To make it easy to correct or adjust deviation in a case where the photographed image from the camera 2 and the depiction position of the guide line deviate from each other because of deviation of the on-vehicle mount position of the camera 2, it may be performed that after calibration is applied to the parameters of the bird's eye view image, correction and adjustment of the deviation between the bird's eye view image and the depiction position of the guide line for the bird's eye view image are carried out; and the correction result and the adjustment result are reflected in the positional relationship between the photographed image from the camera 2 and the depiction position of the guide line. For example, an input portion is disposed in the driving support system in FIG. 1; the photographed image from the camera 2 is transformed into a bird's eye view image; in a state in which the bird's eye view image is displayed, calibration of the parameter h or Θ in FIG. 7 and the above formula (1) is performed by parameter change operation by the user; then, to eliminate the deviation between the bird's eye view image and the depiction position of the guide line for the bird's eye view image by rotation operation and horizontal movement operation by the user, an image (hereinafter, called a bird's eye view image after rotation operation) obtained by rotating the bird's eye view image by a rotation amount based on a signal output from the input portion in response to the rotation operation by the user is generated; and an image (hereinafter, called a bird's eye view image after rotation and horizontal movement operation) obtained by moving the bird's eye view image after rotation operation in a horizontal direction by a horizontal-direction movement amount based on a signal output from the input portion in response to the horizontal movement operation by the user is generated. Here, the rotation amount is stored as a rotation amount of the bird's eye view image into the memory in the guide line depiction position deciding portion 12; and a rotation amount at the time of outputting the photographed image from the camera 2 that corresponds to this bird's eye view image is also calculated from the rotation amount; then, the rotation amount is stored as a rotation amount of the photographed image from the camera 2 into the memory in the guide line depiction position deciding portion 12. Besides, here, the horizontal-direction movement amount is stored as a horizontal-direction movement amount of the bird's eye view image into the memory in the guide line depiction position deciding portion 12; and a horizontal-direction movement amount at the time of outputting the photographed image from the camera 2 that corresponds to this bird's eye view image is also calculated from the horizontal-direction movement amount; then, the horizontal-direction movement amount is stored as a horizontal-direction movement amount of the photographed image from the camera 2 into the memory in the guide line depiction position deciding portion 12.

In the step S4 following the step S3, the guide line depiction position correcting portion 13 determines whether or not an overlap is present between the 3D object region detected in the step S2 and the guide line depiction position. Specifically, it is determined for each pixel of the guide line depiction position whether or not the guide line depiction position is included in the 3D object region detected in the step S2.

In the step S5 following the step S4, the guide line depiction position correcting portion 13 performs correction to obtain only images in the guide line depiction position that are images in the guide line depiction position but are not included in the 3D object region.

Figure 14A:
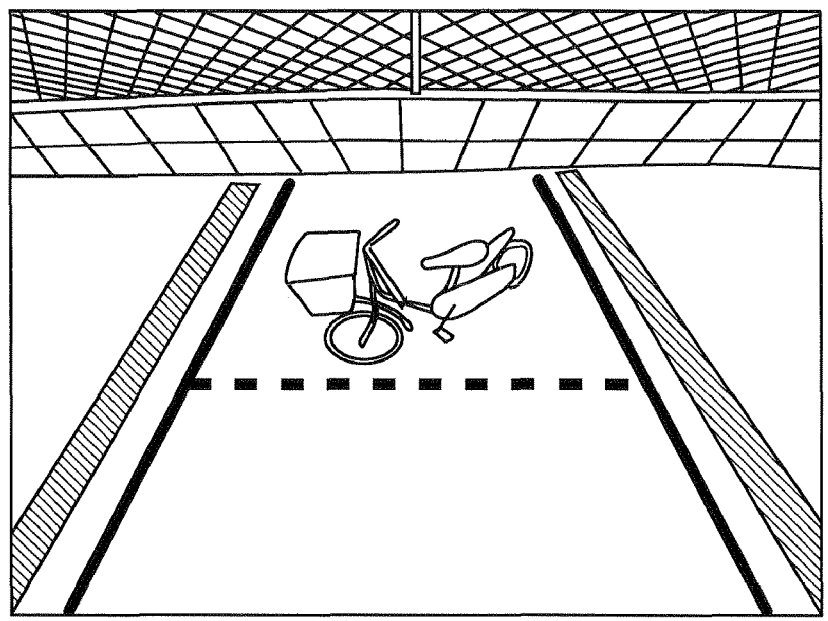
FIGS. 14A and 14B are views showing examples of a driving support image in the first embodiment of the present invention.
Figure 14B:
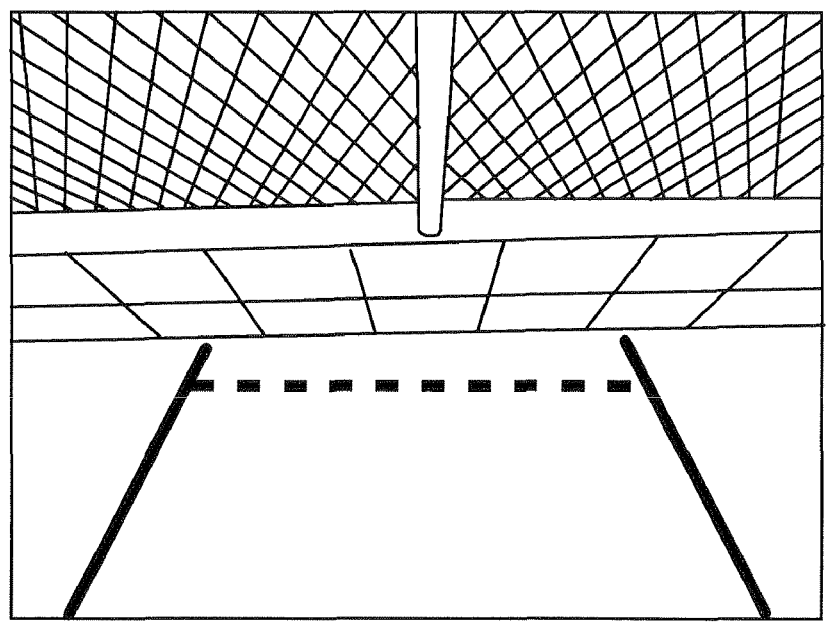
Figure 18A:
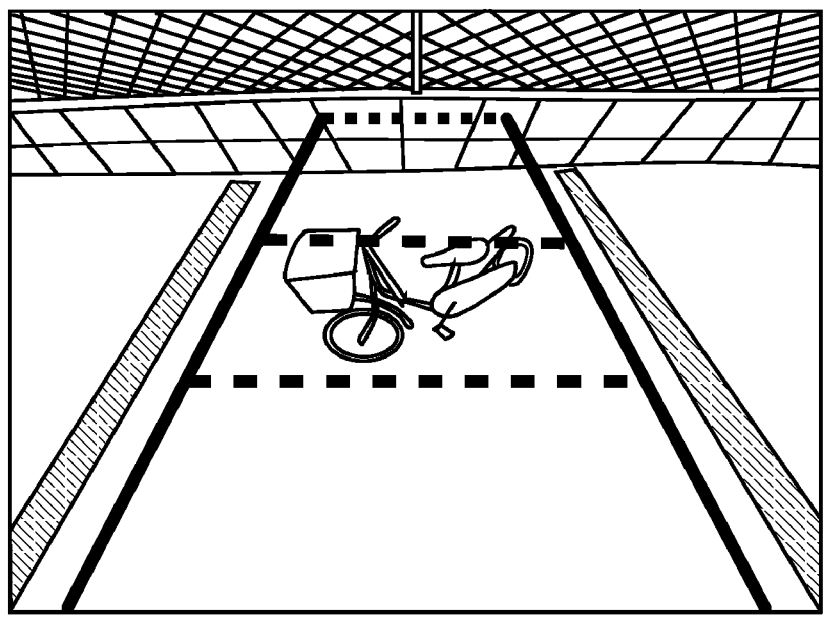
FIGS. 18A and 18B views showing examples of a conventional driving support image.
Figure 18B:
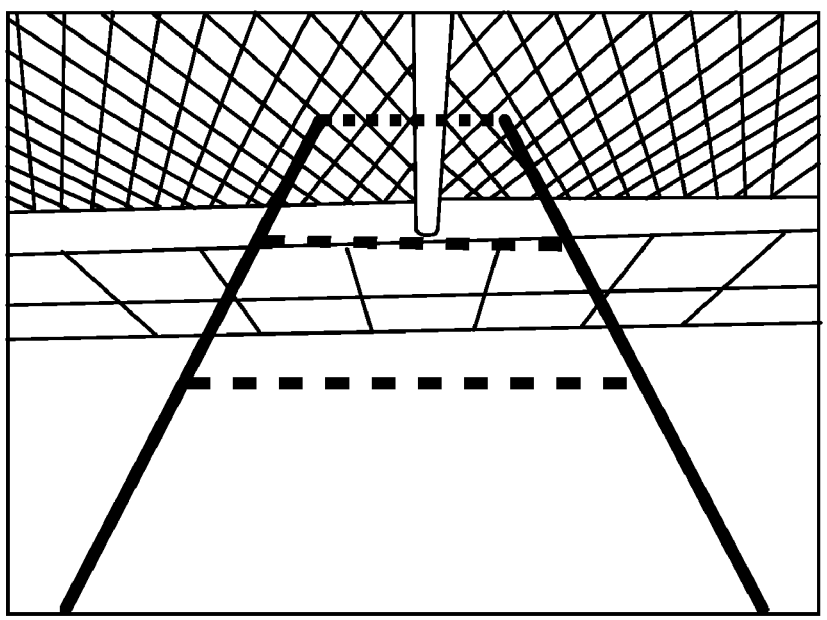

In the step S6 following the step S5, based on the guide line depiction position after correction, the combination portion 14 combines the guide line and the photographed image from the camera 2. In the step S7 following the step S6, the combination portion 14 outputs the combined image as a driving support image to the display device 3. Examples of driving support images displayed by the display device 3 are shown in FIGS. 14A and 14B. Unlike the conventional driving support images shown in FIGS. 18A and 18B, the guide line is not superimposed on a bicycle and a fence that are detected as 3D objects in FIGS. 14A and 14B. In FIG. 14A, line segments indicated by slanted lines represent white lines drawn on a road surface. As described above, the guide line that is a distance index set on the road surface in advance is not superimposed on the 3D objects, so that the lowest necessary guide line for driving support is obtained, and the driving support image which the driver understands easily and visually is able to be displayed on the display device 3.

Second Embodiment

Figure 15:
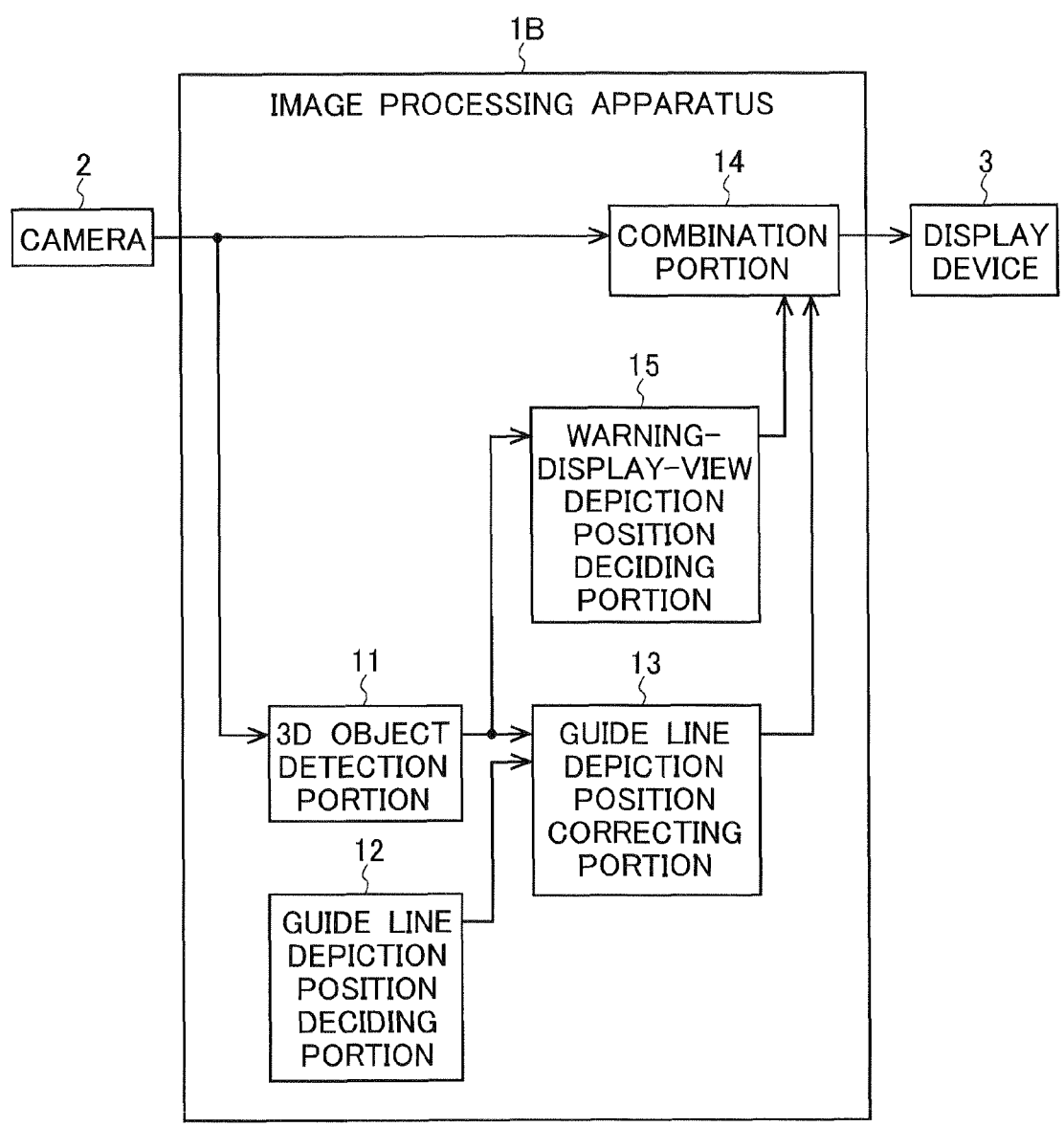
FIG. 15 is a block diagram showing a structure of a driving support system according to a second embodiment of the present invention.

FIG. 15 is a block diagram showing a structure of a driving support system according to a second embodiment of the present invention. The driving support system in FIG. 15 includes: an image processing apparatus 1B that generates a driving support image by using a photographed image from the camera 2 and outputs the driving support image to the display device 3; the camera 2; and the display device 3. The image processing apparatus 1B has a structure obtained by adding a warning-display-image depiction position deciding portion 15 to the image processing apparatus 1A in the first embodiment. Accordingly, only points different from the first embodiment due to the added structure are explained.

Figure 3:
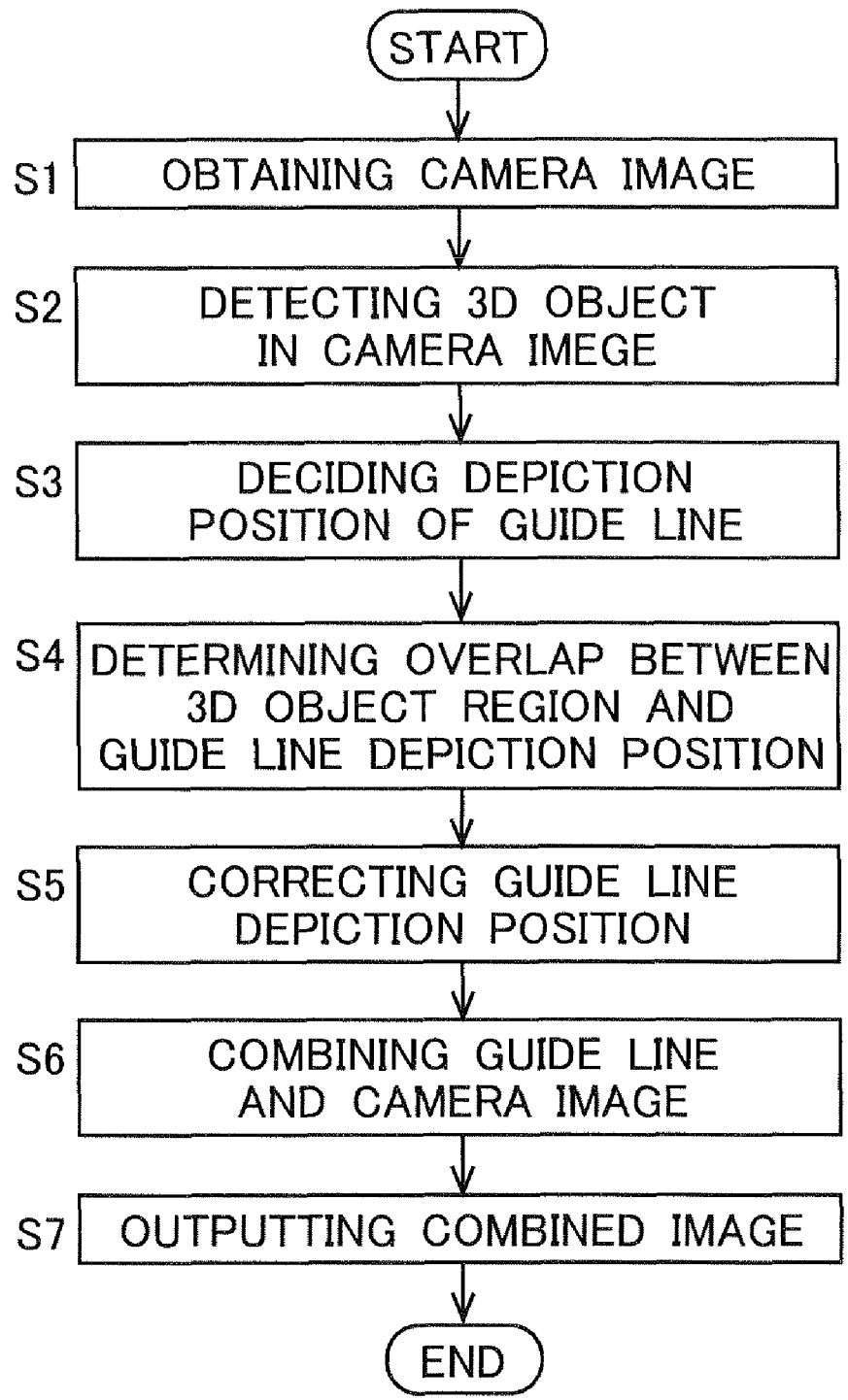
FIG. 3 is a flow chart showing a procedure which an image processing apparatus of the driving support system according to the first embodiment of the present invention executes.

In the second embodiment, between the steps S5 and S6 of the flow chart in FIG. 3, the warning-display-image depiction position deciding portion 15 determines the depiction position of a warning display image to allow the warning display image such as a marking and the like to overlap the 3D object region detected in the step S2. In the step S6, the combination portion 14 combines the warning display image such as a marking and the like together with the guide line and the photographed image from the camera 2.

Figure 16A:
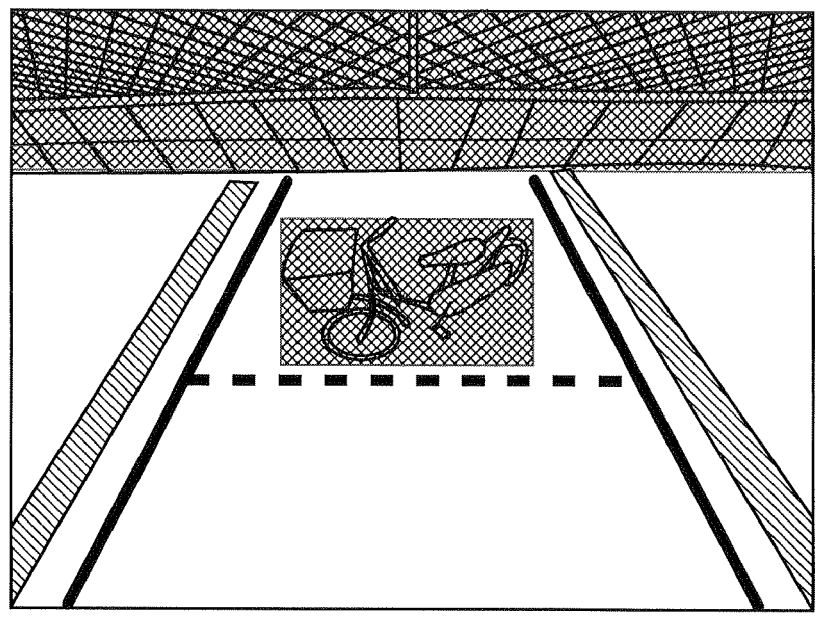
FIGS. 16A and 16B are views showing examples of a driving support image in the second embodiment of the present invention.
Figure 16B:
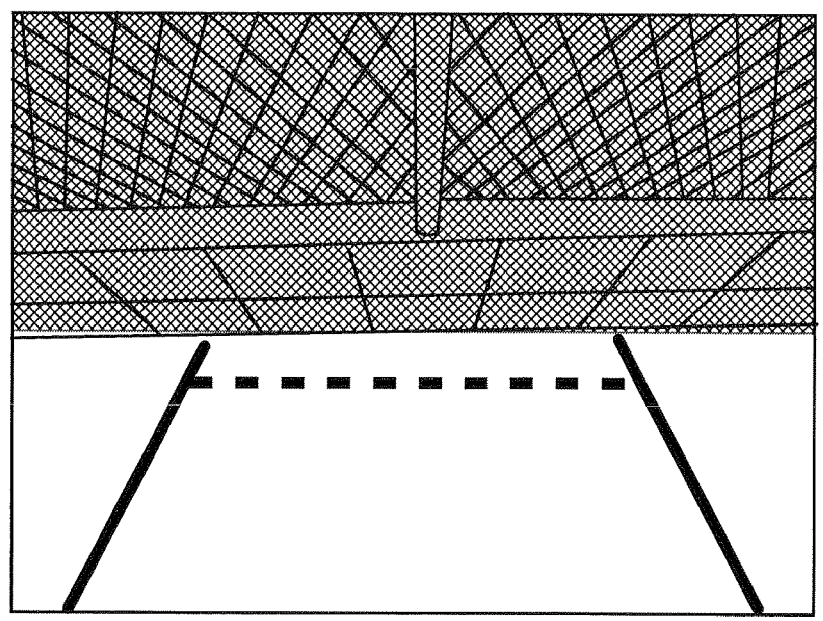

Like in the first embodiment, in the second embodiment as well, because the guide line that is the distance index which is set on the road surface in advance is not superimposed on the 3D objects, the guide line and the warning display image on the 3D object region do not overlap each other (see FIGS. 16A and 16B). Unlike the conventional driving support images shown in FIGS. 18A and 18B, the guide line is not superimposed on a bicycle and a fence that are detected as 3D objects in FIGS. 16A and 16B. Besides, hatched makings are superimposed on the bicycle and the fence detected as the 3D objectives. In FIG. 16A, line segments indicated by slanted lines represent white lines drawn on a road surface. As described above, the guide line and the warning display image on the 3D object regions do not overlap each other, which is not a complicated display. Accordingly, the display of the guide line and the display of the warning display image are compatible with each other.

Third Embodiment

Figure 17:
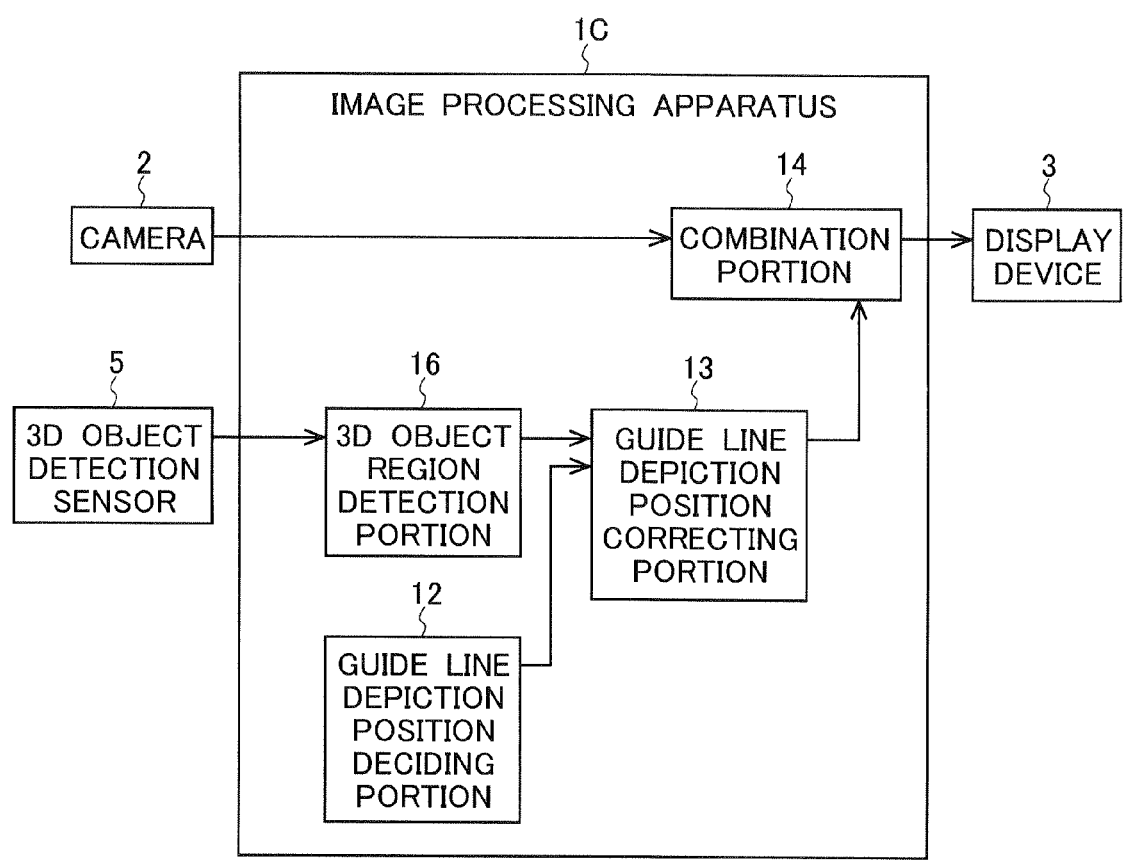
FIG. 17 is a block diagram showing a structure of a driving support system according to a third embodiment of the present invention.

FIG. 17 is a block diagram showing a structure of a driving support system according to a third embodiment of the present invention. The driving support system in FIG. 17 includes: an image processing apparatus 1C that generates a driving support image by using a photographed image from the camera 2 and a detection result from a 3D object detection sensor 5 and outputs the driving support image to the display device 3; the camera 2; the display device 3; and the 3D object detection sensor 5. As the 3D object detection sensor 5, a millimeter wave radar or a laser radar is able to be used. The image processing apparatus 1C has a structure obtained by removing the 3D object detection portion 11 from the image processing apparatus 1A in the first embodiment and disposing a 3D object region detection portion 16 instead. Accordingly, only points different from the first embodiment due to the modified structure are explained.

In the third embodiment, in the step S2 of the flow chart in FIG. 3, based on a detection result from the 3D object detection sensor 5, the 3D object region detection portion 16 detects the 3D object region in the photographed image from the camera 2. The 3D object detection by the 3D object detection sensor generally has a high distance accuracy compared with the 3D object detection by the camera image processing. Accordingly, in the third embodiment, it is possible to improve the 3D object detection accuracy compared with the first embodiment.

Here, it is also possible to combine the third embodiment and the first embodiment, that is, to use both 3D object detection by the 3D object detection sensor and the 3D object detection image processing by the camera image processing. Besides, of course, it is also possible to combine the third embodiment and the second embodiment.

Fourth Embodiment

A structure of a driving support system according to a fourth embodiment of the present invention is the same as the structure of the driving support system according to the second embodiment of the present invention shown in FIG. 15, with the exception that the warning-display-view depiction position deciding portion 15 is different between the second embodiment and the fourth embodiment.

In the second embodiment, between the steps S5 and S6 of the flow chart in FIG. 3, the warning-display-image depiction position deciding portion 15 determines the depiction position of the warning display image to allow the warning display image such as the marking and the like to overlap the 3D object region detected in the step S2. In the step S6, the combination portion 14 combines the warning display image such as the marking and the like together with the guide line and the photographed image from the camera 2.

Figure 19A:
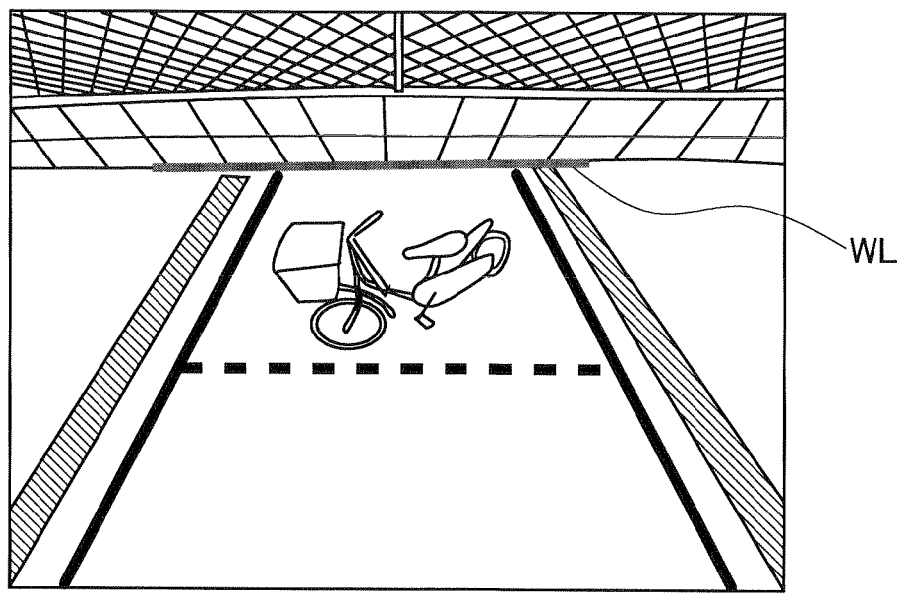
FIGS. 19A and 19B are views showing examples of a driving support image in a fourth embodiment of the present invention.
Figure 19B:
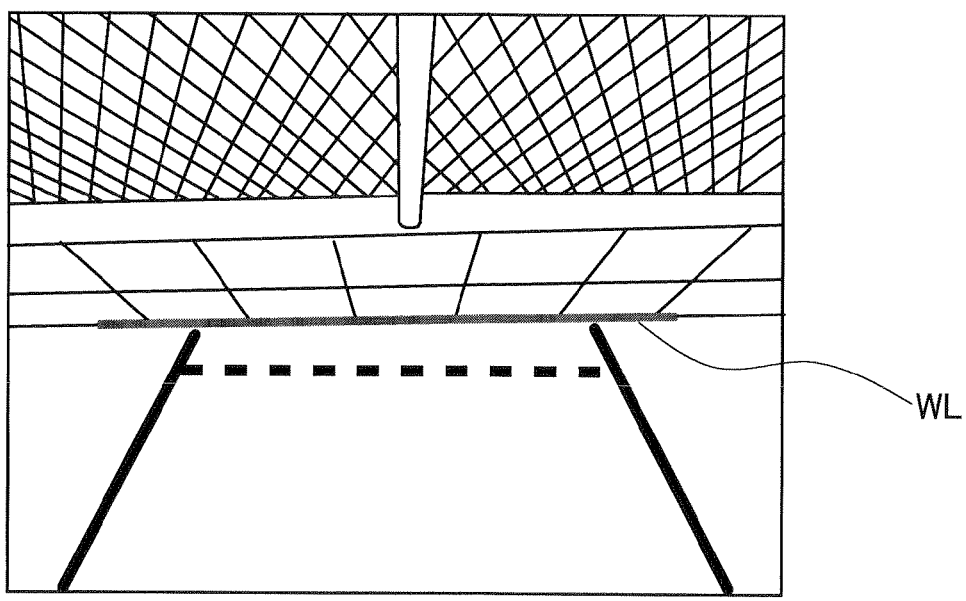

In contrast, in the fourth embodiment, between the steps S5 and S6 of the flow chart in FIG. 3, a step is added, in which the warning-display-image depiction position deciding portion 15 extracts a specific 3D object region (the fence region in the present embodiment) from the 3D object region detected in the step S2 based on the shape and the like of the 3D object region; and decides the depiction position of a warning line WL to allow the warning line WL to overlap at least part of the border between the extracted specific 3D object region and a non-3D object region. In the step S6, the combination portion 14 combines the warning line WL together with the guide line and the photographed image from the camera 2. Thus, the driving support image in the resent embodiment is obtained as shown in FIGS. 19A and 19B. The warning line WL may be a red line that is a general warning color.

In the present embodiment, the 3D object detection image processing by the camera image processing is employed. However, instead of the 3D object detection image processing by the camera image processing, the 3D object detection by the 3D object detection sensor in the above third embodiment may be employed, and the 3D object detection by the 3D object detection sensor in the above third embodiment and the 3D object detection image processing by the camera image processing may be combined with each other.

Modifications

In the above embodiments, although the linear guide line is used as the guide, the guide may have another shape.

Figure 5:
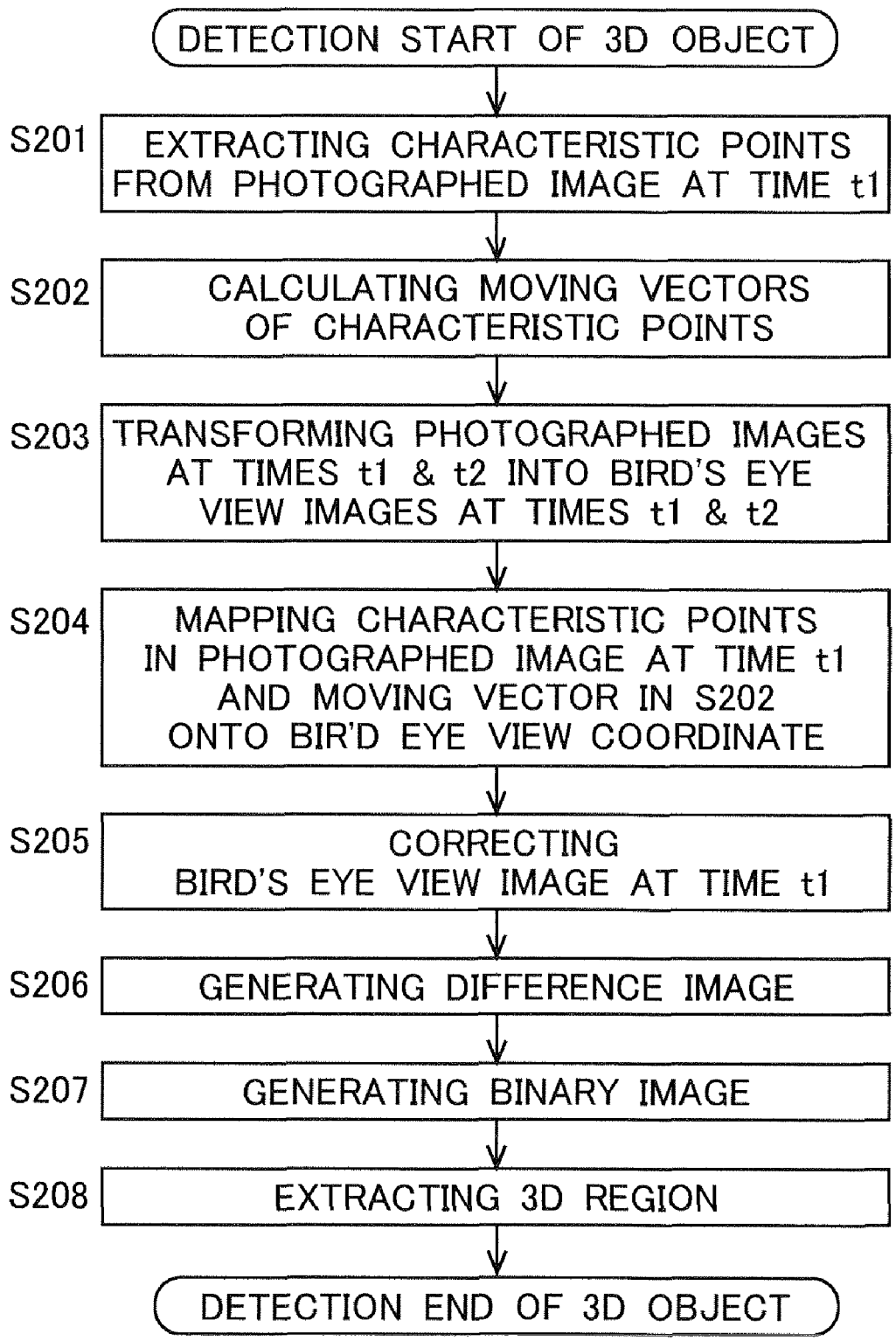
FIG. 5 is a flow chart showing an example of a method for detecting a three-dimensional object from an image taken by a single-lens camera.

In the 3D object detection by the camera image processing, for example, it is possible to prohibit detection of a 3D object that has a predetermined height or lower by setting a threshold value for the binary coding manipulation in the step S207 in FIG. 5. Besides, in the 3D object detection by the 3D object detection sensor, for example, it is possible to prohibit detection of a 3D object that has a predetermined height or lower by setting a sensing direction.

Besides, in the above embodiments, the 3D objects higher than the road surface are detected. However, because the ways of the 3D object detection by the camera image processing and the 3D object detection by the 3D object detection sensor are applicable to detection of a portion lower than the road surface, it may be performed that instead of or together with detection of a portion higher than the road surface, a portion (a portion such as a bank, a side ditch and the like that is lower than the road surface) lower than the road surface is detected and the guide is not superimposed on the portion lower than the road surface.

In addition, in the above embodiments, a structure may be employed, in which the memories (the memory in the 3D object detection portion 11 and the memory in the guide line depiction position deciding portion 12) in blocks of the image processing apparatus are not separately disposed for each block but a memory is shared with a plurality of blocks.

What is claimed is:

1. An image processing apparatus, comprising:
    a guide superimposition portion that obtains a photographed image taken by an imaging device from the imaging device incorporated in a vehicle and superimposes a guide on the photographed image; and
    a specific region detection portion that detects a specific region which may be included in the photographed image,
    wherein if the specific region is detected by the specific region detection portion, the guide superimposition portion does not superimpose the guide on the specific region.

2. The image processing apparatus according to claim 1, wherein the specific region is a three-dimensional object higher than a road surface where the vehicle is present.

3. The image processing apparatus according to claim 1, wherein the specific region is a portion lower than a road surface where the vehicle is present.

4. The image processing apparatus according to claim 1, further comprising a warning-display-view superimposition portion that superimposes a warning display view on the specific region if the specific region is detected by the specific region detection portion.

5. The image processing apparatus according to claim 1, further comprising a warning line superimposition portion that superimposes a warning line on at least part of a border between the specific region and a region that is not the specific region if the specific region is detected by the specific region detection portion.

6. A driving support system, comprising:
    an imaging device incorporated in a vehicle;
    a display device; and
    an image processing apparatus that applies image processing to an image from the imaging device and outputs the processed image to the display device,
    wherein the image processing apparatus includes:
        a guide superimposition portion that obtains a photographed image taken by the imaging device from the imaging device incorporated in the vehicle and superimposes a guide on the photographed image; and a specific region detection portion that detects a specific region which is able to be included in the photographed image, wherein if the specific region is detected by the specific region detection portion, the guide superimposition portion does not superimpose the guide on the specific region.

7. The driving support system according to claim 6, wherein the specific region is a three-dimensional object higher than a road surface where the vehicle is present.

8. The driving support system according to claim 6, wherein the specific region is a portion lower than a road surface where the vehicle is present.

9. The driving support system according to claim 6, wherein the image processing apparatus further includes a warning-display-view superimposition portion that superimposes a warning display view on the specific region if the specific region is detected by the specific region detection portion.

10. The driving support system according to claim 6, wherein the image processing apparatus further includes a warning line superimposition portion that superimposes a warning line on at least part of a border between the specific region and a region that is not the specific region if the specific region is detected by the specific region detection portion.

11. An image processing method, comprising:

a step of obtaining a photographed image taken by an imaging device from the imaging device incorporated in a vehicle;

a step of detecting a specific region which may be included in the photographed image; and a step of superimposing a guide on the photographed image, wherein if the specific region is detected in the detecting step, the guide is not superimposed on the specific region in the superimposing step.

12. The image processing method according to claim 11, wherein the specific region is a three-dimensional object higher than a road surface where the vehicle is present.

13. The image processing method according to claim 11, wherein the specific region is a portion lower than a road surface where the vehicle is present.

14. The image processing method according to claim 11, further comprising a step of superimposing a warning display view on the specific region if the specific region is detected in the detection step.

15. The image processing method according to claim 11, further comprising a step of superimposing a warning line on at least part of a border between the specific region and a region that is not the specific region if the specific region is detected in the detection step.

* * * * *